United States Patent [19]

Curtis

[11] Patent Number: 4,823,433

[45] Date of Patent: Apr. 25, 1989

[54] PAINT BUCKET HANDLE ACCESSORY

[76] Inventor: George C. Curtis, 302 E. 700 South, Springville, Utah 84663

[21] Appl. No.: 145,261

[22] Filed: Jan. 19, 1988

[51] Int. Cl.⁴ ............ A47J 45/07

[52] U.S. Cl. ............ 16/114 R; 220/96

[58] Field of Search ............ 16/110 A, 114 A, 114 R, 16/119, 125; 220/85 E, 85 R, 94 R, 95, 96

[56] References Cited

U.S. PATENT DOCUMENTS

| | | | |
|---|---|---|---|
| 98,291 | 12/1869 | Nashold | 220/96 |
| 338,885 | 3/1886 | Stockinger | 16/125 |
| 554,048 | 2/1896 | Bolus | 220/96 |
| 1,193,585 | 8/1916 | Martindale | 220/96 |
| 1,226,403 | 5/1917 | Snyder | 220/95 |
| 1,243,565 | 10/1917 | Smith | 16/114 R |
| 1,311,005 | 7/1919 | Pettit | 220/96 |
| 2,564,043 | 8/1951 | Ward | 220/96 |

FOREIGN PATENT DOCUMENTS

| | | | |
|---|---|---|---|
| 11162 | of 1904 | United Kingdom | 16/114 R |

*Primary Examiner*—Nicholas P. Godici

*Assistant Examiner*—Edward A. Brown

*Attorney, Agent, or Firm*—Thorpe, North & Western

[57] ABSTRACT

A paint bucket handle accessory includes a generally elongate grip or handle member for grasping in the hand by a user, with the gripper handle member including a groove extending generally the length of the member along the top side thereof. The groove is dimensioned to receive the wire loop handle of a conventional paint bucket. The accessory also includes a hook member extending outwardly and generally perpendicularly from an opposite side of the gripper handle member to terminate in a hook element. The hook element is dimensioned for hooking under the inwardly and downwardly projecting lip formed in the upper edge of a conventional paint bucket. When a wire loop handle of a conventional paint bucket is fitted into the groove of the grip member, and the hook element is placed under the lip of a paint bucket, the grip member may be grasped by hand to lift and hold the paint bucket, while maintaining the wire loop handle to one side of the opening of the bucket. Thus, ready access to the interior of the bucket is allowed.

10 Claims, 2 Drawing Sheets

PAINT BUCKET HANDLE ACCESSORY

BACKGROUND OF THE INVENTION

This invention relates to a holder/handle attachment for use with a conventional paint bucket.

House paint is typically displayed and sold in cylindrical gallon buckets having wire loop handles attached on opposite sides of the buckets near the tops thereof to enable pivoting the wire loop handles up and over the tops of the buckets. Paint is sold in other size containers but those smaller than the gallon buckets typically do not include wire loop handles while those larger may include such handles but also frequently include a gripping element attached to the wire handle to provide a cushion for someone lifting the paint buckets. The gallon paint buckets also typically include an inwardly projecting lip formed at the upper edge of the bucket, with the lip defining a channel for receiving and holding a downwardly projecting lip of the bucket lid. The channel formed in the lip of the bucket also defines a groove on the underneath side of the lip between the bucket wall and the channel bottom.

Painters, both do-it-yourself and professional, oftentimes use paint directly from the gallon buckets by dipping the brush into the bucket to saturate the brush with paint and then removing the brush, to apply the paint to a surface being painted. The bucket may be placed on a support or held by the painter by grasping the wire loop handle. Of course, when held by the painter, the brush must be maneuvered between the painter's hand and the rim of the bucket when inserting the brush into the bucket interior, and then carefully removed to avoid getting paint on the painter's hand. Also, holding the bucket by hand for any length of time can be quite uncomfortable since the bucket's wire handle would tend to press into that part of the hand which is in contact with the wire handle.

SUMMARY OF THE INVENTION

It is an object of the invention to provide a paint bucket handle accessory which enables lifting and holding a conventional paint bucket with a wire loop handle, without the discomfort of the wire loop handle pressing directly against the user's hand.

It is an additional object of the invention to provide such an accessory which, when attached to a paint bucket, tends to stabilize and prevent the free swinging of the bucket.

It is also an object of the invention to provide such an accessory which enables holding a paint bucket so that the hand is positioned to one side of the bucket opening to allow ready access to the interior of the bucket.

It is a further object of the invention to provide such an accessory which may be easily fitted in place on a paint bucket and removed therefrom.

It is still another object of the invention to provide such an accessory which is simple in design and easy to construct.

The above and other objects of the invention are realized in a specific illustrative embodiment of a paint bucket handle accessory adapted for use with a paint bucket having a wire loop handle for lifting the bucket, and an inwardly and downwardly projecting lip on the upper edge of the bucket. The accessory includes a generally elongate handle for grasping by a user, where the handle has a channel formed near the top thereof to extend lengthwise in the handle for receiving the wire loop of the paint bucket. The accessory also includes an elongate element having an attached hook where on end of the hook is placed under the lip of the paint bucket, with the other end being attached to the handle to extend generally perpendicularly therefrom. When the wire loop is positioned in the channel of the handle and the hook is placed under the bucket lip, the accessory holds the wire loop of the bucket to one side of the bucket opening to allow for both comfortably lifting of the bucket and ready access to paint contained in the bucket. Thus, a brush may be dipped into the bucket without getting paint on the hand of the user.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
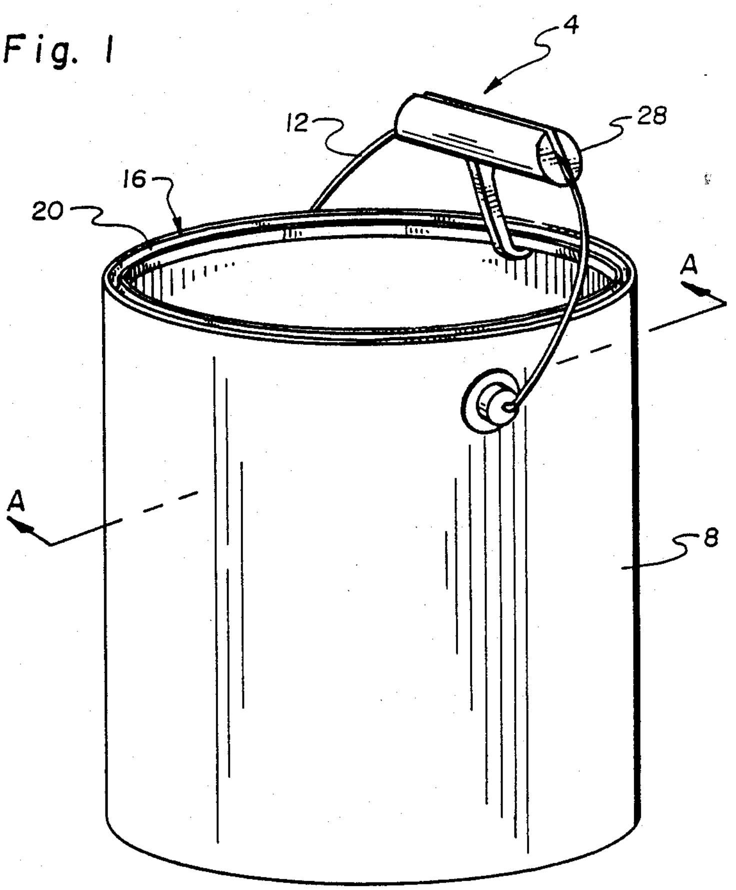
FIG. 1 is a perspective view of a paint bucket handle accessory made in accordance with the principles of the present invention and shown attached to a conventional paint bucket.
Figure 2:
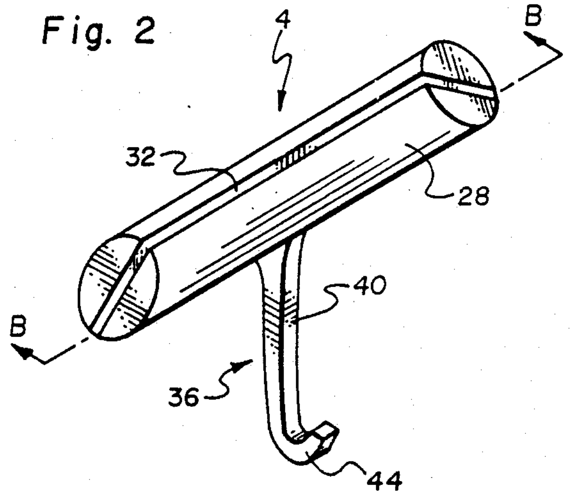
FIG. 2 is a perspective view of the handle accessory of the present invention.

Referring to the drawings, there is shown a paint bucket handle accessory 4 shown in FIG. 1 mounted or fitted onto a conventional gallon paint bucket 8. The paint bucket 8 includes a wire loop handle 12 attached at its ends to each side of the bucket near the top thereof to enable pivoting the wire loop handle from one side of the bucket up and over the top to the other side, in a well known manner.

The bucket 8 also includes an inwardly and downwardly projecting lip 16 formed to define a channel 20 for matingly receiving the downwardly projecting lip of a bucket lid (not shown), all as is well known. The shaping of the lip 16 leaves an interior groove 24 (FIG. 3) which circumscribes the channel 20 and is positioned between the wall of the bucket 8 and that portion of the lip forming the channel 20.

Figure 4:
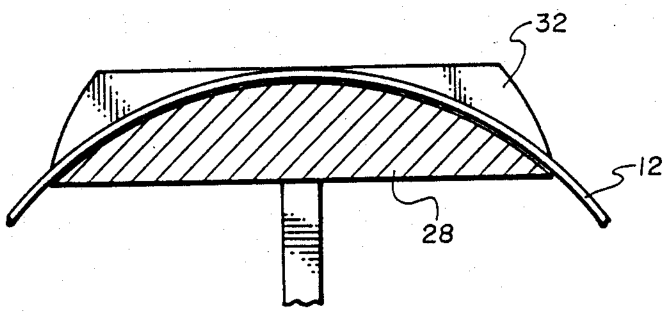
FIG. 4 is a front, cross sectional view of the handle accessory of FIG. 2 taken along lines B—B.

The bucket handle accessory 4 is formed of a piece of material, such as wood, plastic, metal alloy or the like, into a generally elongate, cylindrical body or handle portion 28. The ends of the handle portion 28 are beveled inwardly and upwardly as best seen in FIG. 4. Formed to extend substantially the length of the handle portion 20 on an upper side thereof is a channel 32 having a width sufficient to snuggly receive the wire loop handle 12 of the bucket 8. The bottom wall of the channel 32 is curved, as best seen in FIG. 4, to fit and conform to the curvature of the wire loop handle 12 of the bucket 8. The width of the channel 32 could advantageously be selected to be slightly less than the diameter of the wire loop handle 12 so that when the wire loop handle was fitted into the channel it would be snuggly held in place to securely hold the bucket.

A hook portion 36 of the handle accessory 4 includes an elongate shank 40 attached at one end to the handle portion 28 to extend generally perpendicularly therefrom. The other end of the shank 40 is formed into a hook element 44 and is dimensioned for being received into the groove 24 formed in the lip 16 of the bucket 8. The hook portion 36 might illustratively be constructed of plastic, wire, or similar generally rigid material, and attached to the handle portion 28 by an appropriate adhesive. Alternatively, the handle portion 28 and hook portion 36 could advantageously be integrally formed of a single, unitary piece of material such as plastic by appropriate molding.

Figure 3:
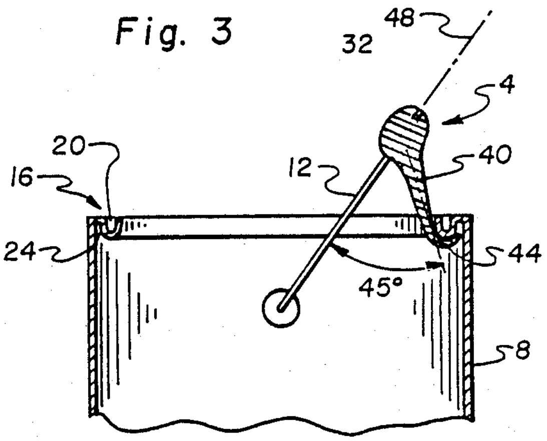
FIG. 3 is a side, cross sectional view of the handle accessory and bucket of FIG. 1 taken along lines A—A.

As best seen in FIG. 3, the vertical, elongate plane, shown by dotted line 48, defined by the channel 32 forms an angle of about 45 degrees with the shank 40 of the hook portion 36 of the accessory 4. The hook element 44 projects away from this defined angle, also as shown in FIG. 3. The length of the hook element 36 is just less than the radius of the wire loop handle 12. With this configuration, when the wire loop handle 12 is fitted in the channel 32 of the handle portion 28, and the hook element 44 is placed in the groove 24, the wire loop handle 12 is held in a position to one side of the bucket opening to allow ready access for inserting a paint brush into and removing the brush from the interior of the bucket 8. With the accessory 4 attached or fitted as indicated, the paint bucket 8 may be easily lifted and held with comfort by the handle portion 28. Use of the handle accessory 4 for holding a paint bucket serves to stabilize the bucket and prevent it from swinging back and forth as it might otherwise tend to do if it were simply held by the wire loop handle 12.

In the manner described, a simple, easy to manufacture paint bucket handle accessory is provided. The accessory may be easily fitted into place for use with a paint bucket and then removed when the painting is completed or the bucket no longer needs to be used. The generally cylindrically shaped handle portion 28 is comfortable to grasp and hold, unlike directly grasping the wire loop handle 12.

It is to be understood that the above-described arrangement is only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A removable holder attachment for use with a paint bucket having a wire loop handle and an inwardly and downwardly projecting lip on the upper rim thereof, said attachment comprising a handle for grasping by a user, said handle including a channel formed generally on the top thereof and dimensioned for removably receiving the wire loop of the paint bucket, and an elongate element having a hook which at one end is placeable under the lip of the paint bucket, the other end of which is attached to the handle so that when the wire loop is positioned in the channel of the handle and the hook is placed under the bucket lip, the bucket may be lifted by the handle to position and hold the wire loop to one side, allowing access to the interior of the bucket.

2. A holder attachment as in claim 1 wherein the bottom wall of the channel is curved to conform to the curvature of the wire loop handle of the bucket.

3. A holder attachment as in claim 1 wherein the length of the elongate element is less than the radius of the wire loop handle.

4. A holder attachment as in claim 1 wherein the handle and elongate element are integrally formed of a unitary, piece of material.

5. A holder attachment as in claim 1 wherein the handle is generally cylindrical in shape.

6. A removable paint bucket handle accessory for use with a paint bucket having a wire loop handle for lifting the bucket and an inwardly and downwardly projecting lip on the upper edge of the bucket, said accessory comprising a generally elongate grip member for grasping in the hand of a user, said grip member including a groove extending generally the length of the grip member on one side thereof and dimensioned to snuggly yet movably receive the bucket's wire loop handle, and a hook member extending outwardly and generally perpendicularly from an opposite side of the grip member to terminate in a curved element dimensioned for hooking under the bucket lip, the length of said hook member being marginally less than the radius of the wire loop handle.

7. An accessory as in claim 6 wherein the hook member projects from the grip member at an angle of about 45 degrees from the elongate plane defined by the groove, with the curved element curving away from the angle between the plane and the hook member.

8. An accessory as in claim 7 wherein the bottom wall of the groove is formed to generally conform to the curvature of the wire loop handle.

9. An accessory as in claim 6 wherein the transverse cross-section of the grip member is generally cylindrical.

10. An accessory as in claim 6 wherein the grip member and hook member are integrally formed.

* * * * *